United States Patent [19]

Jensen

[11] Patent Number: 4,698,082
[45] Date of Patent: Oct. 6, 1987

[54] HOLLOW FIBER BUSHING AND HOLLOW FIBER TIP CONSTRUCTION

[75] Inventor: Thomas H. Jensen, Murrysville, Pa.

[73] Assignee: PPG Industries, Inc., Pittsburgh, Pa.

[21] Appl. No.: 914,428

[22] Filed: Oct. 2, 1986

Related U.S. Application Data

[63] Continuation-in-part of Ser. No. 812,580, Dec. 23, 1985, abandoned.

[51] Int. Cl.⁴ .......................................... C03B 37/022
[52] U.S. Cl. ............................................. 65/1; 65/86; 65/121; 425/133.1; 425/462; 425/DIG. 217
[58] Field of Search .......................... 65/1, 2, 86, 121; 425/133.1, 462, DIG. 217

[56] References Cited

U.S. PATENT DOCUMENTS 3,526,571 9/1970 Ogata ........................ 425/DIG. 217

Primary Examiner—Robert L. Lindsay
Attorney, Agent, or Firm—John E. Curley

[57] ABSTRACT

A bushing support system for anchoring hollow fiber forming tips in a fiber glass bushing is described. The truss like support for the air tubes and bushing tips insure minimal movement of the tips during bushing operation and that any movement is accompanied by corresponding movement of their tubes to thereby maintain the initially established concentricity of tube wall to tip wall when the tubes are positioned in the interior of the tips.

8 Claims, 4 Drawing Figures

HOLLOW FIBER BUSHING AND HOLLOW FIBER TIP CONSTRUCTION

This applicaion is a continuation-in-part of Ser. No. 812,580, filed Dec. 23, 1985, now abandoned.

The present invention relates to a fiber forming bushing suitable for use in producing hollow fibers. More particularly, the present invention relates to a novel bushing tip for use in preparing hollow fibers. Still more particularly, the present invention relates to a bushing tip, gas introduction means and support means utilized to produce uniform hollow fibers and glass fibers in particular on a continuing basis from a fiber glass forming bushing.

BACKGROUND OF THE INVENTION

In U.S. Pat. No. 3,268,313 assigned to the assignee of the instant invention, a method and apparatus is shown and described for forming hollow glass fibers. In the apparatus shown therein, a plurality of orifices were provided in the bushing bottom for the passage of streams of glass from a molten glass source contained within the bushing proper. A plurality of tubes were extended into each of those orifices and were arranged substantially concentrically with the respective orifice so that each tube extended beyond the terminus of its respective orifice a fixed distance. In the claims of that patent, this distance was between 0.03 and 0.06 inches. A gas was then introduced into the tube and the anulus surrounding the tube was supplied with molten glass. This method of introducing the gas to the glass stream produced a glass fiber having a central lumen or a hollow center and the glass fibers were then gathered into continuous strand form.

While the apparatus and method described in the aforementioned U.S. patent was satisfactory in that hollow glass fibers were produced, the uniformity of the fibers was found to be somewhat less than satisfactory. It was found in operating bushings of the type described in the aforementioned U.S. patent, for example, that hollow fibers that were produced changed dramatically over time. It was found that as the bushing faceplates were subjected to continuous use, their normal tendency to warp or bow into a slight curvature from end to end occurred just as it does in a normal fiber glass bushing operation. As a result, the gas tube introducing gas into the glass stream of the bushing tip would remain stationary while the bushing tip itself would move with respect to the tube, thereby distorting the lumen of the hollow fiber being produced. This rendered the lumen of the fibers no longer concentric since the anulus formed by the bushing tip and the air tubes had become distorted from its original concentric shape. The result of this operation was the production of glass fibers which had eccentric lumens as well as erratic K values from fiber to fiber in a given strand. Strands were produced in which the fibers had extremely erratic K values and in many instances, glass strands containing large numbers of solid fibers were being produced after the bushing had been operated for an extended period.

Thus, a need exists in the art to provide a hollow fiber bushing and bushing tip arrangement which is capable of producing substantially uniform hollow glass fibers as the bushing continues to operate. By substantially uniform glass fibers is meant glass fibers in a multifiber strand which have a central lumen defining the internal diameter of the fiber and a more or less uniform outside diameter and wherein the average K value of the fibers in the strand is a reasonably high value (above 0.5) and few, if any, of the fibers contained in a given strand produced from a multi tip bushing contain solid fibers, i.e., there are less than 10 percent of the total fibers with K values below 0.5.

SUMMARY OF THE INVENTION

One of the objects of the instant invention is to provide an improved hollow fiber bushing tip.

A further object of the instant invention is to provide a hollow fiber bushing tip suitable for use in producing hollow glass fibers.

A still further object of the instant invention is to provide a hollow fiber bushing tip which will produce uniform fibers regardless of distortions in the bushing faceplate utilized in conjunction with such a bushing tip.

A still further object of the present invention is a hollow fiber bushing tip which is firmly anchored to the bushing faceplate and to the gas delivery tube utilized in the bushing tip.

A still further object of the present invention is to provide a hollow fiber bushing tip, a concentrically disposed gas tube for formation of hollow glass fibers from glass emanating from the anulus formed between the tip walls and the walls of the gas tube.

A still further object of the invention is to provide a means to anchor a gas tube inside of a bushing tip and to the bushing bottom or tip plate which will maintain the spatial relationships between the tip, the tube and the tip plate constant over running time.

A still further object of the instant invention is to provide uniform movement of the gas tube and the bushing tip when movement of the bushing faceplate occurs due to metal distortion of the bushing faceplate.

A still further object of the invention is to provide a method of continuously centering the gas tube associated with a fiber glass bushing tip in the tip during operation to provide for a concentrically disposed central lumen in glass fibers produced from such a bushing tip.

These and other objects of the invention will become apparent to those skilled in the art from the ensuing description of the invention.

BRIEF DESCRIPTION OF THE DRAWINGS

Reference is made to the accompanying drawings in which.

DETAILED DESCRIPTION OF THE DRAWINGS

Figure 3:
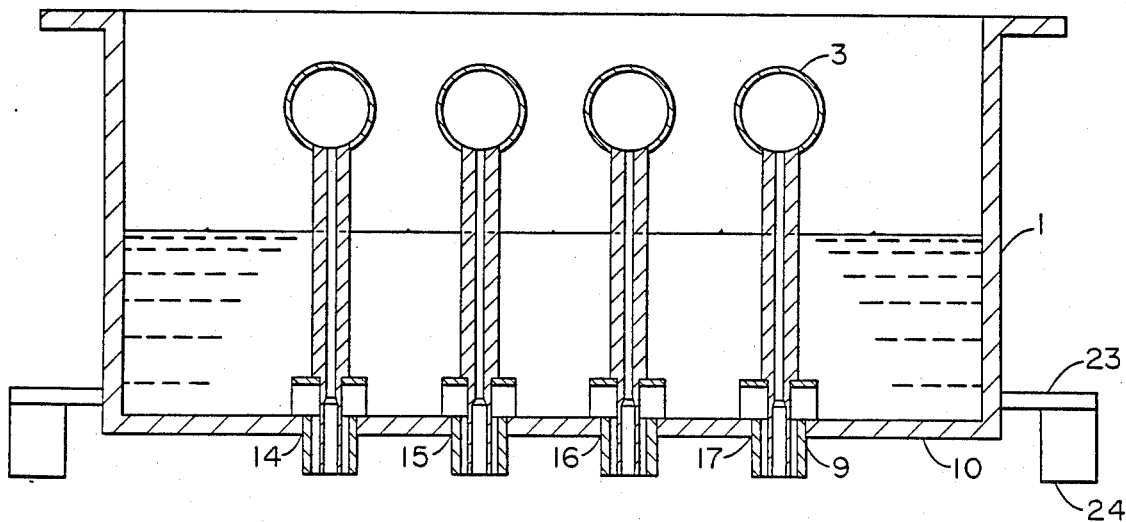
FIG. 3 is the bushing of FIG. 1 taken along lines III—III to show the multiple bushing tips utilized in the bushing.

Referring to the drawings and FIGS. 1 and 3 in particular, there is shown a bushing, 1, having a tip plate, faceplate, or bottom 10 (hereinafter called tip plate) in which holes 14, 15, 16 and 17 are provided. Each of the holes 14, 15, 16, and 17 have a bushing tip, 9, therein, the tips 9 being welded to faceplate 10 by weld 22 shown in FIG. 1. An air tube 6 having a central air passage 8 is placed in the interior of each of the bushing tips 9 and the outside wall 7 of tube 6 and the inside wall 11 of tips 9 form an annular space 13 for the passage of molten glass 4 from the zone 25 to a point below the end of tips 9. The upper end of each tube 6 is affixed to an air manifold 3 having a central conduit 2. At the opposite end of tube 6, the tube is counterbored to a larger diameter 12.

The bushing 1 also is provided with a bushing connector 23 which is connected to a terminal 24. Each of the tubes 6 shown have a bracket 19 associated therewith which can be seen most clearly in FIGS. 1, 2, and 4.

Figure 1:
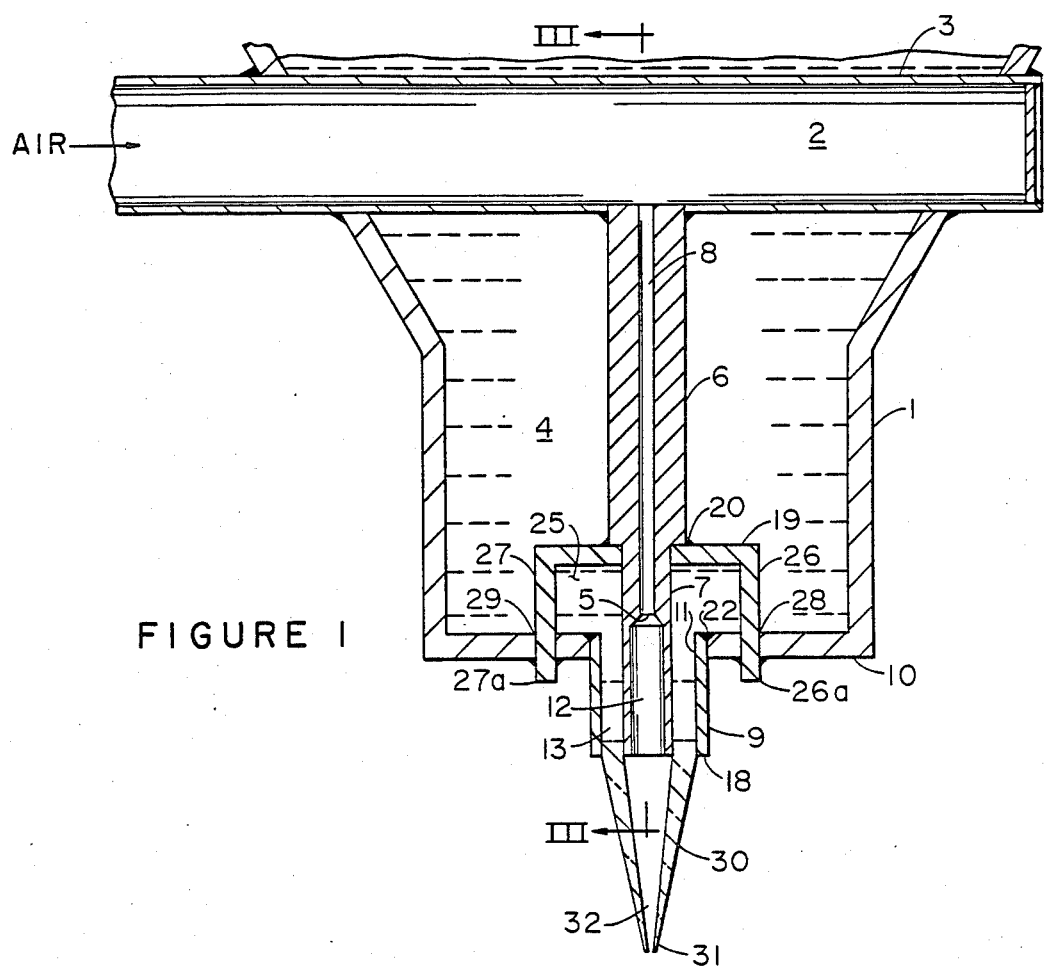
FIG. 1 is an enlarged side elevation of a bushing and bushing tip constructed in accordance with the instant invention showing one embodiment of an air introducing means.

Turning now to FIG. 1, there is shown therein a bushing 1 and its associated tip plate 10. The tip plate is provided with two holes, 28 and 29 which have, legs 26 and 27 of the bracket member 19 inserted therein. The end portions 27(a) and 26(a) of legs 27 and 26 respectively extend through the holes 29 and 28 respectively a sufficient length to provide a volume of metal in and below those holes sufficient when melted to fill holes 28 and 29 completely and thereby become an integral part of the tip plate 10. Bracket 19 completely surrounds the tube 6 which is rigidly attached to conduit 3 at welds 40. The bracket 19 is firmly welded to tube 6 by weld 20, thus forming with the legs 27 and 26, the tip plate 10 and the attachment of 6 to conduit 3 a truss arrangement. This attachment of the bracket 19 to the tip plate 10 insures that tube 6 is firmly affixed to the tip plate 10 and that it will retain it's position relative to the tip during use. Stated in another way, the arrangement of the bracket 19 with respect to the tube 6, the tip 9 and the attachment of tube 6 to header 3 (shown in FIG. 3) provides structural integrity to tip plate 10 such that little or no distortion occurs during use thereby maintaining the tube 6 and tip 9 constant in their geometric, spacial relationship during use.

The glass cone, 30 formed by the bushing tip 9 shown in FIG. 1, has generally straight, tapered sides which ultimately form the hollow fiber 31 from the glass 4 leaving the bushing through passageway 13 and the gas which exits the bushing at the counterbored opening 12 of air tube 8.

The embodiment shown in FIG. 1 is the preferred embodiment of the instant invention for the formation of hollow fibers. For most glass compositions, utilization of this particular arrangement has been found to be the most satisfactory. The bracket, 19 however, can be used in bushing tips of the type shown in the aforementioned prior art, i.e., U.S. Pat. No. 3,268,313.

Figure 2:
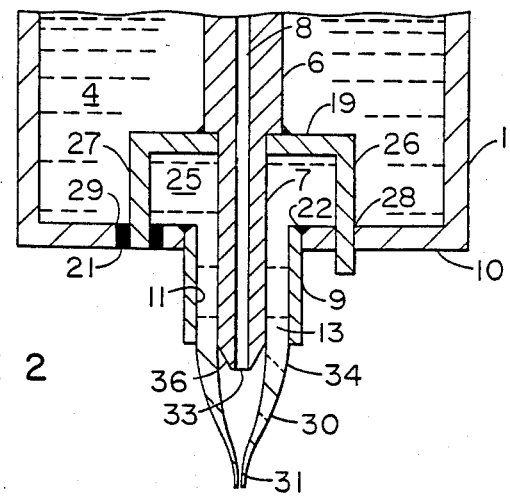
FIG. 2 is a side elevation of a bushing tip constructed in accordance with the instant invention having another embodiment of an air introduction means.

A bushing tip 9 of the type shown U.S. Pat. 3,268,313 is illustrated in FIG. 2. As shown in FIG. 2, the bushing, 1 is provided with two holes 28 and 29 in its tip plate, 10 through which are inserted legs 27 and 26 of bracket member 19. Legs 27 and 26 extend through the openings 28 and 29 respectively to a point below the bushing faceplate 10. Legs 27 and 28 are of sufficient volume that upon melting they fill holes 28 and 29 completely, and become a part of the tip plate 10. The air tube 6 is positioned, as in the tip 9 of FIG. 1, in a centrally disposed relationship with respect to bushing tip 9 and forms an annulus 13 between the outer surface 7 of tube 6 and the inside surface 11 of the bushing tip 9. The passageway 13 communicates with glass in the interior of bushing 1 in zone 25 so that the molten glass 4 can flow through passageway 13 inside of the tip member 9. The end of tube 6 has a downwardly tapered exterior wall 36 terminating at the exit point 33 of channel 8. The tips 9 are positioned as shown in the aforementioned U.S. Pat. No. 3,268,313 below the horizontal plane in which the glass emanating from passageway 13 enters the environment. The cone of glass 30 formed with this tip has a slight bulge to it but ultimately forms the fibers 31 as shown.

Figure 4:
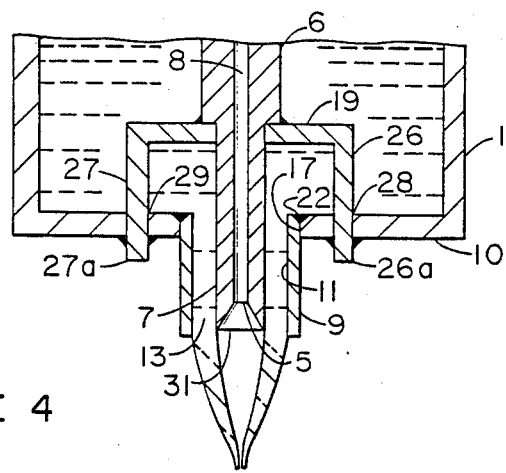
FIG. 4 is a side elevation of a bushing tip and air introduction tube of the instant invention with a still further embodiment of an air introduction means.

In FIG. 4, a bushing 1 with a tip plate 10 is provided with a a bushing tip 9 welded thereto at weld 22. A tube 6 is positioned centrally in tip 9 to provide a passageway 13 between the inside wall 11 of the bushing tip 9 and the outside wall 7 of the tube 6. The gas exit 31 of channel 8 associated with tube 6 is located at approximately the same height as the bushing tip 9 exit and is fed from the outlet 5 in channel 8. This arrangement is provided by counterboring the tube 6 at the end portion thereof to form a counterbored opening 31 provided with a central orifice 5 therein at the end of tube 6. Bracket member 19 is affixed via legs 27 and 26 through holes 29 and 28 respectively, the holes being in the bushing tip plate 10 and the legs 27 and 26 extending below the tip plate to form extensions 27a and 26a. After they are positioned therein, extensions 27a and 26a are heated and the metal of 27a and 26a melts to fill up the holes 28 and 29 to therein become a solid metal part of the faceplate 10.

While several embodiments of the bracket and support members of the instant invention have been shown in the associated drawings, obviously new nozzle arrangements can be made so long as the main air tube is concentrically placed within the bushing tip and welded to the faceplate or affixed to the faceplate in a rigid manner so that no movement can occur between the air tube and the bushing tip during use. It will be readily understood by the skilled artisan that by firmly welding the bracket member 7 around the tube 6 and firmly attaching it to the tip plate, in fact, as preferred by melting the tabs or legs 27a and 26a to form a portion of the faceplate thereby, the tube 6 and its associated conduit 8 will always move with the bushing tip 9 associated therewith when the tip 9 may be downwardly, sidewardly or otherwise displaced due to any slight warpage of the tip plate 10 during operation. This arrangement ensures the obtaining of uniform concentric holes in the fibers formed at these tips regardless of the positioning of the tip with respect to it's original position. The axis of the tip and the axis of the gas tubes associated therewith generally will always remain in the same alignment even if the bushing faceplate becomes slightly distorted. The arrangement is such that the tip plate is essentially supported so that its tendency to sag is greatly reduced thereby keeping the tips and their associated tubes in their original spacial alignment.

In operating the bushings and tips of the initial invention, molten glass 4 is maintained molten by applying current from a transformer (not shown) to terminal 24 and bushing ear 23 into the bushing 1. Gas, preferably air, is passed through the conduit 2 formed by pipe or manifold 3 into the passageway 8 of the gas tube 6. The gas then passes downwardly. In FIG. 1, it exits at orifice 5 into opening 12 from which it exists the end of tip 9.

Glass 4 contained in the bushing passes through passageway 13 in bushing tip 9 and surrounds the gas emanating from the end of the channel 12, thereby forming a hollow glass cone, 30 shown in FIG. 1, for example, which is then drawn downwardly into a filament 31 which ultimately assumes a fixed outside diameter and possesses a lumen 32 with a fixed inside diameter. The filament is then wound on the surface of the winder used to draw it or chopped by the chopper used to draw it. In either case, it is then collected. In a standard operation, the filaments being formed in this manner are continuous filaments and they are gathered from a multiplicity of the bushing tips 9 as shown in FIG. 3 and gathered into a single strand from which they then are wound on a collection surface such as a collet position on the outside of the winder.

While the invention has been described with reference to certain specific examples and illustrative embodiments, it is not intended to be limited thereby except insofar as appears in the accompanying claims.

I claim:

1. A bushing for producing hollow fibers comprising a container for molten glass, orifices in said container for removing glass as a plurality of hollow streams from said container, a gas tube positioned in each said orifice forming an annulus with each said orifice for transporting the molten glass outside of said container, anchoring means around the tube centering the tube in said orifices, means for attaching the anchoring means of each orifice to the container adjacent the associated orifice to thereby anchor the tube to the container so that the tube will maintain a constant spacial relationship to the orifice during use.

2. The bushing of claim 1 wherein the anchoring means is having an opening therein adapted to receive said tube and wherein the tube is welded to said bracket around the entire opening.

3. The bushing of claim 2 further including at least two legs depending from said bracket and having their ends fused to the said container adjacent each said orifice.

4. A bushing for producing hollow fibers comprising a container for molten glass, a plurality of hollow tips depending from orifices on said container for removing glass from said container in a plurality of streams, a gas introduction tube in each of said tips concentric with the tip walls thereby forming an annulus, anchoring means spaced from said container and surrounding each tube to maintain each tube in the center of its associated tip, means depending from each said anchoring means to firmly attach them to said container adjacent each of said tips to thereby prevent any relative movement of the tip and tube.

5. A bushing and tip construction comprising a bushing for having molten glass, a plurality of orifices with coextensive, depending tips on the bottom of said bushing, a gas introduction tube centered in each of said tips and concentric with the walls of each tip to thereby form an annulus to remove glass from the bushing, means to introduce gas into said gas introduction tube, a bracket having a central aperture surrounding said tube at a point above the bushing bottom and fastened to said tube around the said aperture, at least two legs depending from said bracket downwardly to the bushing bottom, both of said legs being anchored to the bushing bottom adjacent to each tip to thereby form a truss for each said tube which ensures that the tip and its associated tube maintain a constant, spacial relationship during operation of the bushing.

6. The bushing of claim 5, wherein the ends of said legs are inserted in holes in the bushing bottom and fused to anchor them to the bushing bottom.

7. The bushing of claim 5, wherein the said bracket is welded around the outside wall of the tube at the aperture in each said bracket and the end of the legs of said bracket are fused into said bushing bottom to anchor the bracket to the bushing bottom.

8. The bushing of claim 5, wherein the means to introduce gas to the tube is a conduit to which the said tube is firmly attached.

* * * * *